July 1, 1930.  C. B. SPENCER ET AL  1,769,654
FRUIT PEELING AND CORING MACHINE
Filed Dec. 10, 1926   3 Sheets-Sheet 1
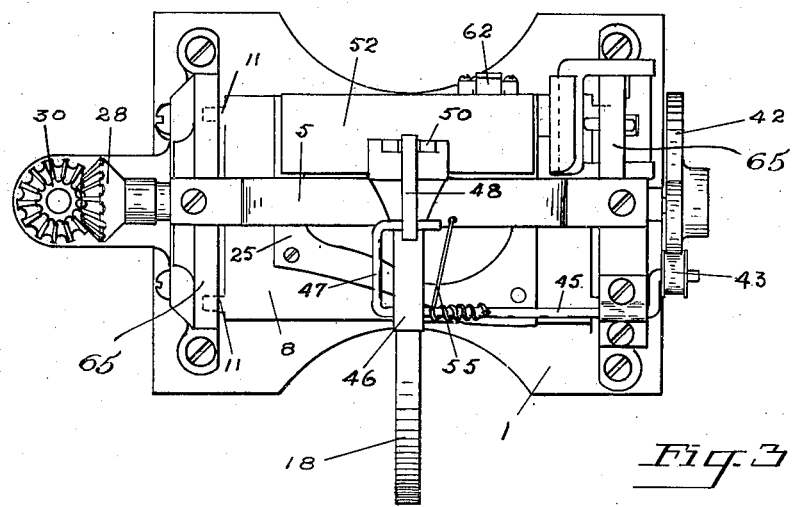
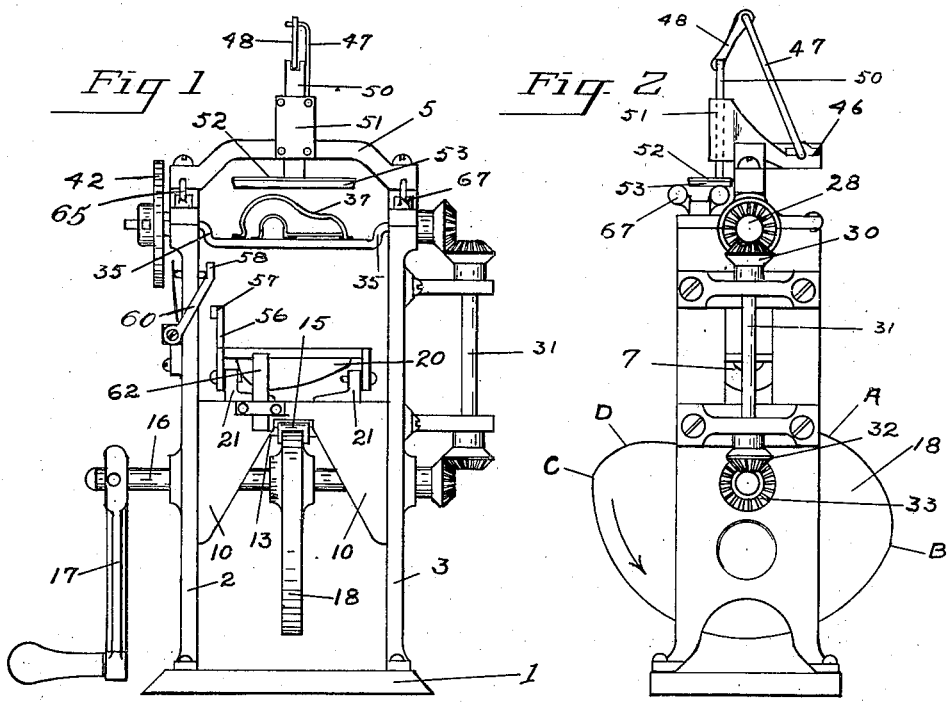
Inventors
Cecil B Spencer,
and
L. Moore Canaday,
By Horace Barnes,
Attorney.

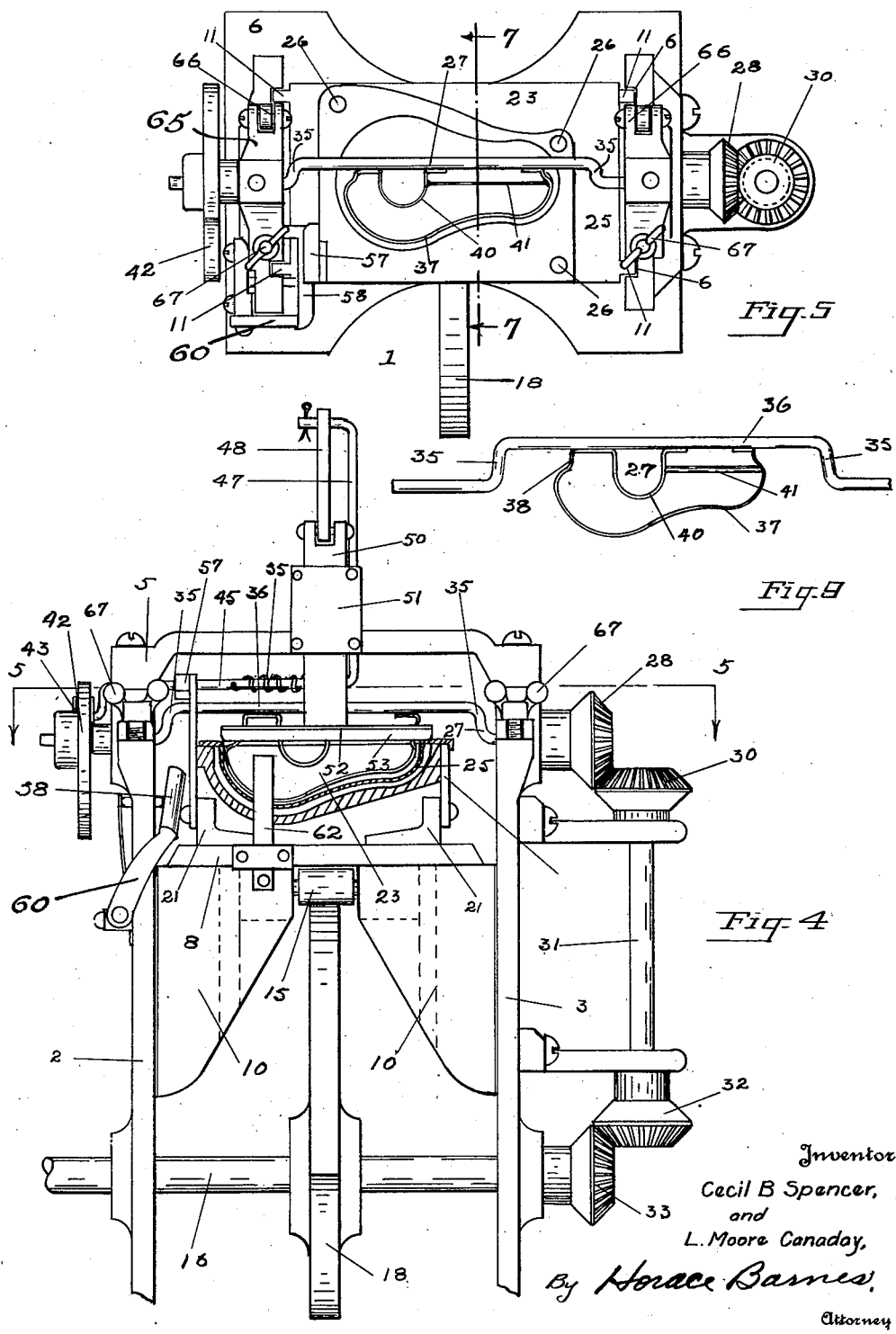

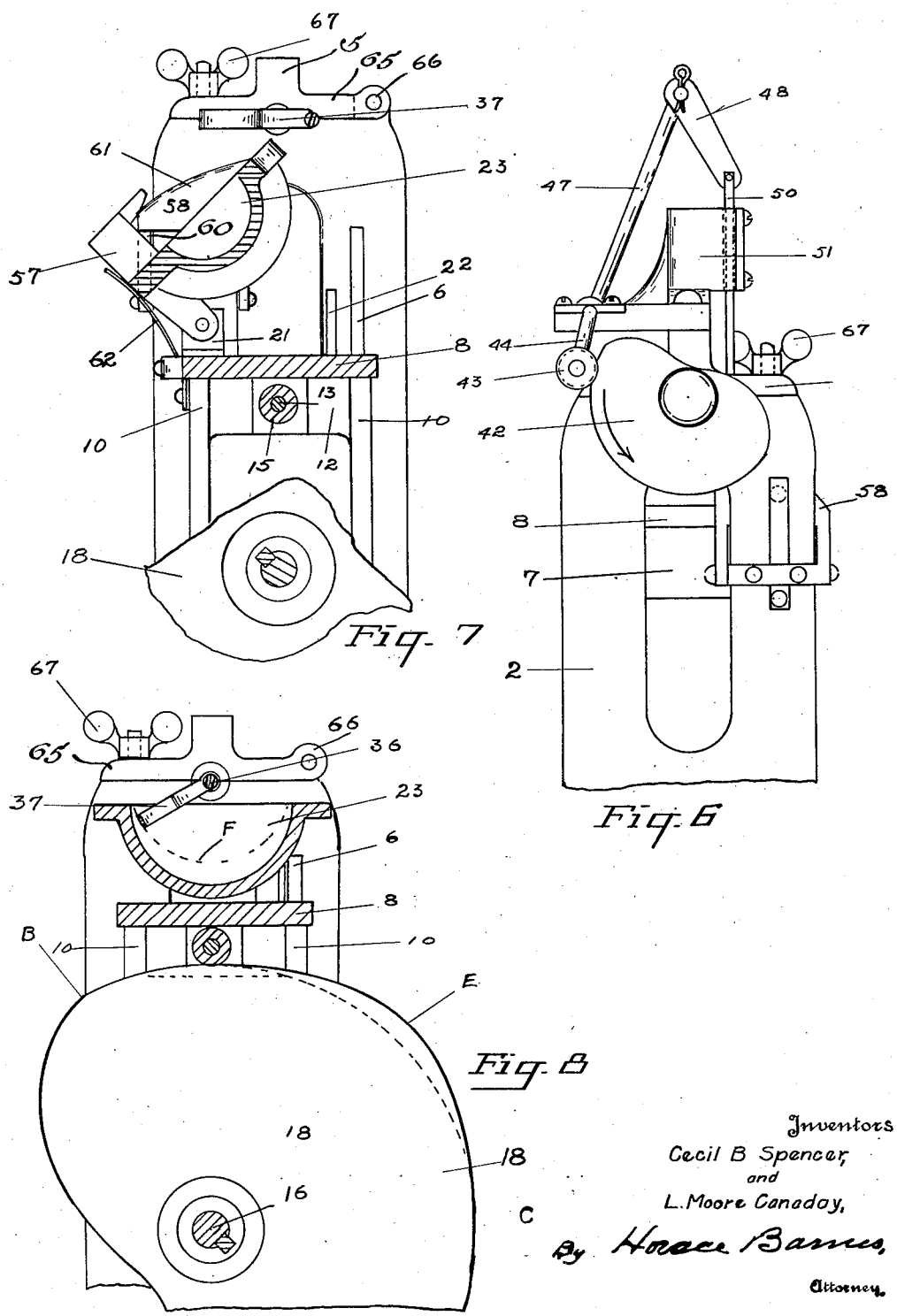

Patented July 1, 1930

1,769,654

UNITED STATES PATENT OFFICE

CECIL B. SPENCER AND L MOORE CANADAY, OF ALBANY, OREGON

FRUIT PEELING AND CORING MACHINE

Application filed December 10, 1926. Serial No. 153,758.

This invention relates to improvements in machines for peeling and coring fruit, and particularly to improvements in that class of peeling and coring apparatus illustrated and described in our prior patent application Serial No. 140,259.

The object of the present invention is to provide a machine of simple construction actuated by power or manually, utilizing specific peeling and coring devices of the type described in our said prior application, whereby fruit may be prepared for commercial canning or preserving economically and with the maintenance of a high grade in the standard of the fruit so packed.

Other objects and advantages of our invention and objects relating to details of construction and arrangement of the various parts of our improved fruit peeling and coring machine, will be readily apparent in the course of the detailed description to follow.

The accompanying drawings illustrate by way of example a preferred peeling and coring machine for pears embodying our invention, in which:

Figure 1 is a view in front elevation of a machine embodying our invention.

Fig. 2 is a view in side elevation of the same.

Fig. 3 is a top plan view on an enlarged scale of the same.

Fig. 4 is a fragmentary view in front elevation of the machine shown in a different operative position than that indicated in Fig. 1.

Fig. 5 is a view in cross section on line 5—5 of Fig. 4.

Fig. 6 is a fragmentary view in side elevation of a machine from the side opposite to that shown in Fig. 2.

Fig. 7 is a partial view in cross section on line 7—7 of Fig. 5.

Fig. 8 is a view in vertical section of the upper portion of a machine showing a slightly modified form of our invention.

Fig. 9 is a detached view in side elevation of a knife arbor and knives secured thereto.

Referring to said views, wherein similar reference characters indicate like parts in the several views, the reference numeral 1 indicates the base of our improved machine, and 2 and 3 vertical spaced standards rigidly secured thereon. Said standards are secured at their tops in parallel relation by a bridge bar 5. Upon the inner side of each of said standards vertically arranged spaced parallel guide slots 6 are formed.

A vertically reciprocating carriage 7 is operative between said standards having a horizontal bed plate 8 and vertically disposed flanges 10 upon each side in register with the guide slots 6 and from which protrude guide fins 11 received in and slidable in said slots. Transverse webs 12 connect said flanges upon each side of the vertical transverse axis of the machine in which the opposite ends of the axle 13 of an antifriction roller 15 are mounted.

16 indicates a shaft rotatably mounted in said standards in vertical alignment with the roller axle 13. Power may be applied to said shaft at one end, as through a crank and handle 17.

Midway between the standards 1 and 2 an operative cam 18 is keyed on said shaft having its marginal edge shaped in a predetermined contour and upon which the carriage 7 is supported through the engagement of the carriage roller 15 thereon. The carriage 7 is actuated in its upward travel by the cam 18 and descends through its gravity as controlled by its engagement upon said cam, as will be more fully described hereinafter.

A tray 20 is mounted pivotally upon the carriage bed plate 8, its forward edge being pivotally connected to lugs 21 of the bed plate and its rear edge supported upon pins 22. Said tray is formed with a receptacle 23 in its upper horizontal face of such depth and conformation to fit the contour of a one-half section of the fruit to be peeled therein, which for purposes of illustration is a pear. Said receptacle is designed to receive half sections of pears of the largest size, and when pears of smaller dimensions are to be peeled therein sheet metal fillers, such as shown at 25, of special dimensions to fit the particular size and run of pears, may be employed, as indicated in Figs. 4 and 5, and which may be fixedly secured to the tray by means of screws 26.

The numeral 27 indicates a knife arbor mounted adjacent the upper ends of the standards 1 and 2 and which is rotatably actuated by means of a beveled gear 28 keyed upon one end and which is driven by means of a beveled pinion 30 upon a vertical shaft 31 having a similar beveled pinion 32 at its lower end in mesh with a beveled gear 33 keyed to the shaft 16. By such transmission devices the arbor 27 is rotated in unison with the shaft 16.

Intermediate the standards 1 and 2 the arbor 27 is formed with offset portions 35 and a straight section 36 in parallel with the opposite extremities of the arbor. Secured to the straight intermediate portion of said arbor is a peeling knife 37 extending in the same plane as the offset portions 35 and shaped to conform to the longitudinal section of the receptacle 23 with which it is to be used and in spaced relation therewithin to effect a cutting stroke within the fruit to remove the peeling therefrom. At the larger end of the knife, as at 38, said knife may be indented for the purpose of removing the blossom from the pear with the peeling.

Secured to said arbor within the space formed by the peeling knife 37 and in the same plane therewith is a coring blade 40 for the purpose of removing the core of the pear, and extending from one side of the coring blade to the smaller end of the peeling knife a knife blade 41 is fixedly mounted in parallel with the arbor portion 36 for the purpose of removing the stem of the pear. Said blades may be of relatively narrow steel sharpened on their advanced edges and may be curved in the direction of their travel if desired.

Mounted upon the end of the arbor 27 opposite to the beveled gear 28 a cam 42 is keyed which is formed with a configuration substantially similar to that of the cam 18, and its peripheral cam surface is arranged in substantially the same relation with a roller 43 as the cam 18 is to the roller 15.

The roller 43 is mounted upon a swinging arm 44 of a rod 45 and which is pivoted horizontally at the upper end of the standard 2 and in a bracket 46 extending rigidly from the bridge bar 5. An arm 47 of said rod is pivotally connected to a link 48 connected at its other end to a bar 50 slidable vertically in guideways 51 mounted upon said bridge bar. At the lower end of the bar 50 a presser plate 52 is rigidly mounted extending in horizontal relation. Said presser plate is thus reciprocated vertically in the rotation of the cam 42 and in substantial synchronism and in opposed movements to the carriage 7, whereby the presser plate descends and presses upon one side of the pear section furthest removed from the point of entrance of the knife into the pear at the moment when the cutting knife engages the pear in its peeling operation.

On the under side of said presser plate a cushion pad 53 of rubber or the like is mounted, against which the knife will contact momentarily to complete a clean cut of the peeling from the pear. At the moment this is accomplished the further movement of the cam 42 will release the roller 43, whereupon a coil spring 55 upon the rod 45 will cause the arm 47 to actuate the slide bar 50 upwardly and thus remove the presser plate out of the path of rotation of the cutting knives.

Rigidly secured to the tray 20, adjacent the standard 2, is an upwardly extending arm 56, having a laterally extending lug 57. A wiping plate 58 is mounted upon an arm 60, pivoted in the standard 2, which is spring pressed inwardly into the path of the lug 57. Upon the upward movement of the carriage and tray thereon the lug 57 will engage the wiping plate 58, which will yield outwardly to permit said lug passing thereby. Upon the completion of the peeling operation and upon the downward travel of the carriage the lug 57 will engage the wiping plate 58, which has a sloping forwardly inclined wiping surface 61 and which will cause the tray to be tilted sharply forwardly to eject the pear section together with its severed peeling and core, as indicated in Fig. 7, and against a spring 62, and immediately upon the ejection of the fruit the tray will snap back into its horizontal position through the effect of the spring 62 thereagainst and to its original position at rest upon the pins 22.

The operation of our invention may be further described as follows: With the machine in the position illustrated in Figs. 1 and 2, the operator will place a half-section of fruit in the receptacle 23. The carriage will then be in engagement with the lowermost portion of the cam 18, while the knife 37 will have reached a position substantially vertically over its axis. The shaft 16 then being rotated to actuate the cam 18 in the direction of the arrow, as indicated in Fig. 2, the carriage will be lifted through the engagement of the roller 15 upon the cam surface indicated at A, which is developed to elevate the carriage in a constant upward movement whose highest point is reached at about the point B of the cam, which is about 90° of a complete rotation of the cam, whereupon the knife 37 will be positioned to just about enter in its cutting movements in the fruit and extending in a horizontal plane.

From the point B on the cam to the point C thereof the cam periphery is circular and maintains the carriage in its uppermost position during the cutting operation when the knives are cutting through the pear to remove the peeling, the core, and the stem. At the same time or slightly before the knives begin their cutting operations the presser plate 52 is depressed through the agency of the cam 42, as previously described, to press upon the fruit upon the opposite side thereof to that in which the knives begin their cutting operation and toward which the sweeping cut is being made. As soon as the knives have traveled through the pear and into contact with the pad 53 of the presser plate the point C of the cam 18 will have been reached and thereafter the further rotation thereof brings the cutaway portion D of the cam into contact with the roller 15 to admit of the carriage rolling thereupon by gravity at a relatively fast rate, in the initial stages of which the ejecting operations effected by the wiping plate 58, heretofore described, will take place.

The provision of the offset section 36 of the arbor 27 upon which the peeling and cutting knives are mounted admits of the sharpened edges of the knives being extended to and beyond the axis of rotation of the knives and thus admit of a full cutting stroke of 180° through the pear.

Another method of insuring the cutting of the peeling from the pear at a uniform depth throughout is illustrated in Fig. 8, wherein the cam perimeter 18 is shown as being formed intermediate the points B and C with a raised portion E departing from the circular configuration as in the apparatus heretofore described, whereby the carriage 7 and tray thereon is first elevated slightly intermediate of the cutting operations and then depressed to the same extent, so that the tray 20 will move upwardly relative of the knife to maintain the cutting edge of the knife at a uniform distance from the inner periphery of the receptacle and then be depressed in a like manner during the latter half of its cutting operation.

Knives of various sizes may be employed to conform to the different receptacles and fillers 25 and to admit of such knives being readily interchanged the bridge bar 5 is made integral with supports 65 hingedly connected at 66 to the rear of the frames, while the forward ends are secured by clamping screws 67. Half of the bearings of the arbor containing the various sized knives are received within said supports so that they can be readily interchanged, in an obvious manner.

Having described our invention, what we claim, is:

1. Fruit peeling and coring apparatus, consisting in a frame having a movable carriage, a receptacle for fruit, mounted on said carriage, means for actuating said carriage, a knife arbor rotatably actuated in unison with said carriage, and knives rigidly mounted on said arbor to remove the peeling and core of the fruit placed in said receptacle.

2. Fruit peeling and coring apparatus, consisting in a frame, a carriage reciprocable in said frame, a tray mounted upon said carriage having a receptacle to contain a half-section of fruit, means for actuating said carriage, a knife arbor arranged for rotation in unison with said carriage, knives rigidly mounted on said arbor, and a presser plate actuated to engage the fruit during the cutting operation of said knives.

3. Fruit peeling and coring apparatus, consisting in a frame having a reciprocatively movable carriage, a tray hingedly mounted upon said carriage having a receptacle therein to contain a half-section of fruit, means for actuating said carriage, a knife arbor rotated in unison with the movements of said carriage, a plurality of knives rigidly mounted on said arbor, and means to rock said tray upon its pivotal connections in the return movement of said carriage to eject the fruit in said receptacle.

4. Fruit peeling and coring apparatus, consisting in a frame, a reciprocatively movable carriage, a receptacle for fruit mounted on said carriage, means for actuating said carriage, a knife arbor rotatably mounted in said frame having an offset portion intermediate its bearings in said frame, means to actuate said arbor in unison with said carriage, and a plurality of knives rigidly mounted on the offset portion of said arbor and directed through the axial line of rotation of said arbor.

5. Fruit peeling and coring apparatus, consisting in a frame, a reciprocally movable carriage, a rotatable shaft, a cam on said shaft to actuate said carriage, a tray on said carriage to contain a half-section of fruit to be peeled, a knife rotatably mounted to sever the peeling from the fruit at the uppermost position of said carriage, and driving connections from said shaft to actuate said knives in unison therewith.

6. Fruit peeling and coring apparatus, consisting in a frame, a carriage reciprocally movable in said frame, a rotatable shaft, a cam on said shaft formed to actuate said carriage upwardly and to maintain it at its uppermost position during the peeling operations, a tray mounted on said carriage having a receptacle for fruit to be peeled, a knife arbor rotatatively actuated by said shaft, and a plurality of knives mounted on said arbor.

7. Fruit peeling and coring apparatus, consisting in a frame, a carriage reciprocally movable in said frame, a rotatable shaft, a cam on said shaft formed to actuate said carriage upwardly and to maintain it at its uppermost position during the peeling operations, a tray mounted on said carriage having a receptacle for fruit to be peeled, an arbor mounted in said frame and formed with an offset portion parallel with its axis of rotation, a plurality of knives rigidly secured to the offset portion of said arbor and disposed in a radial plane through the axis of rotation of the arbor, and means to rotate said arbor from said shaft.

8. Fruit peeling and coring apparatus, consisting in a frame, a carriage reciprocally movable in said frame, a rotatable shaft, a cam on said shaft formed to actuate said carriage upwardly and to maintain it at its uppermost position during the peeling operations, a tray mounted on said carriage having a receptacle for fruit to be peeled, a knife arbor rotatively actuated by said shaft, a plurality of knives mounted on said arbor, a presser plate to engage the fruit in said receptacle during the peeling operation, and a cam on said arbor substantially similar in form to said first named cam to effect the operative engagement of said plate with the fruit.

9. Fruit peeling and coring apparatus, consisting in a frame having a movable carriage, a receptacle for fruit, mounted on said carriage, means for actuating said carriage, a knife arbor rotatably actuated in unison with said carriage, and knives rigidly mounted on said arbor to remove the peeling and core of the fruit placed in said receptacle, said knives having their axis of rotation offset from the center of the fruit being peeled.

10. Fruit peeling and coring apparatus, consisting in a frame having a movable carriage, a receptacle for fruit, mounted on said carriage, means for actuating said carriage, a knife arbor rotatably actuated in unison with said carriage, knives rigidly mounted on said arbor to remove the peeling and core of the fruit placed in said receptacle, and means to cause said knives to follow the contour of the fruit being peeled although their axis of rotation departs from the center of the fruit.

CECIL B. SPENCER.
L MOORE CANADAY.